(12) United States Patent  
Doddy et al.

(10) Patent No.: US 8,904,547 B2  
(45) Date of Patent: *Dec. 2, 2014

(54) NOTIFICATION UPON EXPOSURE TO OFFENSIVE BEHAVIORAL PATTERNS IN COLLABORATION

(75) Inventors: Leigh T. Doddy, Sunbury (AU); Christopher J. Hockings, Burleigh Waters (AU)

(73) Assignee: International Business Machines Corporation, Armonk, NY (US)

( * ) Notice: Subject to any disclaimer, the term of this patent is extended or adjusted under 35 U.S.C. 154(b) by 1378 days.

This patent is subject to a terminal disclaimer.

(21) Appl. No.: 12/348,728

(22) Filed: Jan. 5, 2009

(65) Prior Publication Data

US 2010/0175129 A1 Jul. 8, 2010

(51) Int. Cl.
*G06F 7/04* (2006.01)
*G06Q 10/06* (2012.01)

(52) U.S. Cl.
CPC ....................................... *G06Q 10/06* (2013.01)
USPC .............................. 726/27; 709/203; 709/206

(58) Field of Classification Search
CPC ............................... H04L 67/22; G08B 31/00
USPC ..................... 726/27; 709/203, 206
See application file for complete search history.

(56) References Cited

U.S. PATENT DOCUMENTS

| 6,898,631 | B1 | 5/2005 | Kraft et al. | |
| 7,444,403 | B1 * | 10/2008 | Packer et al. | 709/224 |
| 7,881,944 | B2 * | 2/2011 | Heller et al. | 705/319 |
| 8,291,065 | B2 * | 10/2012 | Goodman et al. | 709/224 |
| 2002/0143577 | A1 * | 10/2002 | Shiffman et al. | 705/2 |
| 2004/0111479 | A1 * | 6/2004 | Borden et al. | 709/206 |
| 2008/0168095 | A1 * | 7/2008 | Larcombe et al. | 707/104.1 |
| 2008/0189380 | A1 * | 8/2008 | Bosworth et al. | 709/207 |
| 2009/0299925 | A1 * | 12/2009 | Ramaswamy et al. | 706/12 |

FOREIGN PATENT DOCUMENTS

WO     WO2006094335     9/2006

* cited by examiner

*Primary Examiner* — Christopher Brown
(74) *Attorney, Agent, or Firm* — DeLizio Gilliam, PLLC

(57) ABSTRACT

A system and method for protecting a user from offensive behavior in communications and notifying the user and/or an enforcement entity of the offensive behavior. The offensive content analysis system monitors communications between users for offensive behavior. The offensive content analysis system may measure the level of current offense in the communication and determine a historical offensive behavior pattern for the user. The offensive content analysis system may then determine if the offensive behavior, both current and historical, rises to a threshold behavior level. The offensive content analysis system may take notification action if the offensive behavior meets the threshold level.

20 Claims, 6 Drawing Sheets

NOTIFICATION UPON EXPOSURE TO OFFENSIVE BEHAVIORAL PATTERNS IN COLLABORATION

BACKGROUND

Embodiments of the inventive subject matter generally relate to the field of communications and, more particularly, to techniques for monitoring offensive behavior in communications and notifying an enforcement entity of the offensive behavior.

The use of the internet and messaging technologies has the potential to expose individuals to inappropriate or offensive material. For example children may access websites which have explicit adult oriented material or express views which are inappropriate for children. Security features exist to reduce an individual's exposure to offensive material. For example, a computer administrator, or guardian, may block or filter certain websites from view. However, due to the volume of websites on the internet, the individual may still be able to access inappropriate or offensive material on sites about which the computer administrator is unaware. Filtering websites, or content on websites, does not protect the individual from the ever-changing content on the internet.

SUMMARY

Embodiments described herein relate to a method comprising detecting a communication from a device, wherein the communication is associated with a user. The method further comprises determining a current offensive behavior metric of the communication, wherein the current offensive behavior metric is a level of offensive material contained in the communication. The method further comprises determining a historical offensive behavior pattern for the user, wherein the historical offensive behavior pattern is a record of offensive material contained in one or more past communications associated with the user. The method further comprises determining that the current offensive behavior metric and the historical offensive behavior pattern reached a threshold behavior level wherein the threshold behavior level is established by an enforcement entity and notifying the enforcement entity about the offensive behavior.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
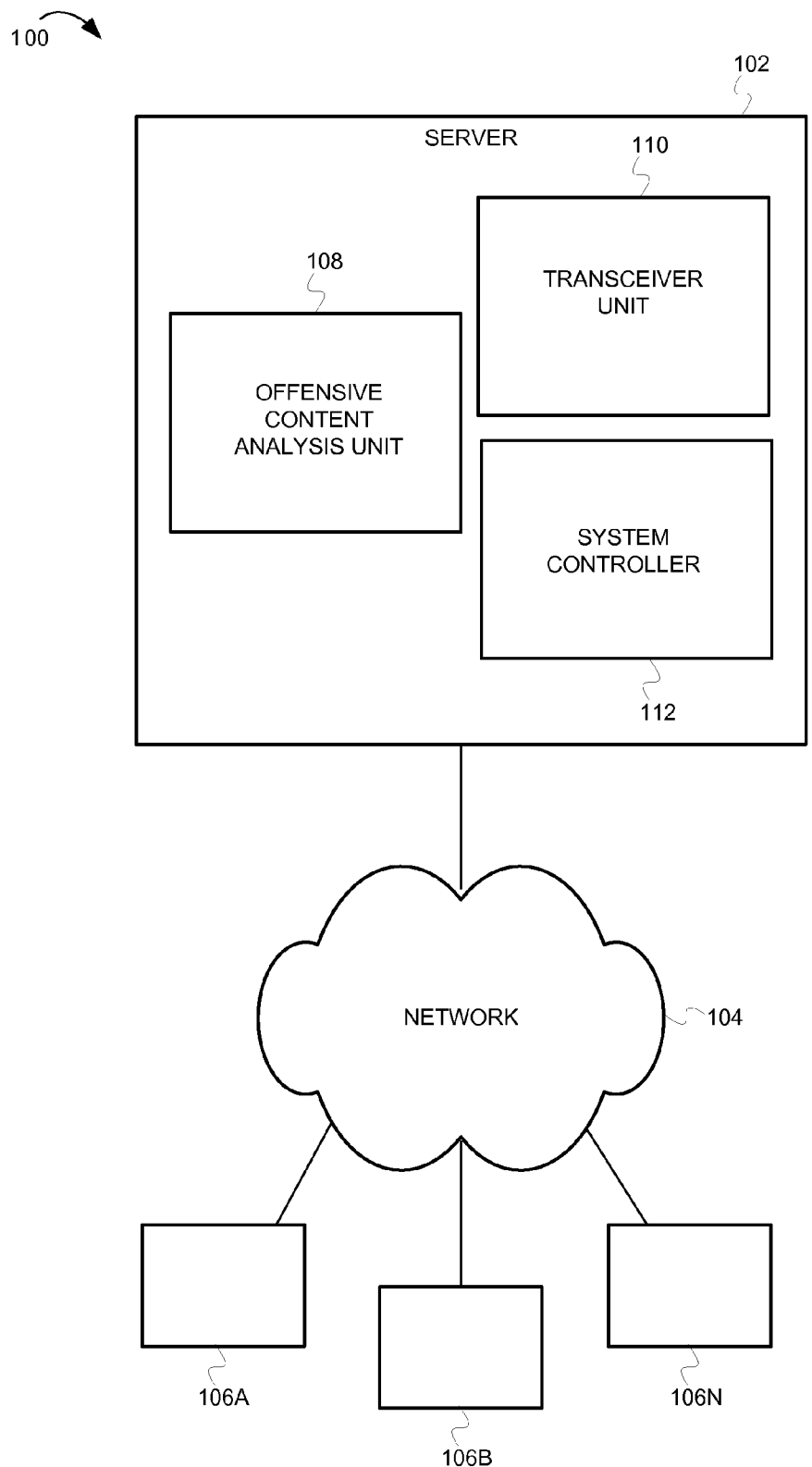
FIG. 1 depicts a block diagram illustrating a communication management system configured to detect offensive behavior in a communication and notify an enforcement entity in an embodiment of the invention.

The description that follows includes exemplary systems, methods, techniques, instruction sequences and computer program products that embody techniques of the present inventive subject matter. However, it is understood that the described embodiments may be practiced without these specific details. For instance, although examples refer to monitoring real time communications between client users and notifying a user or enforcement entity, it should be appreciated that the methods described herein may be used for monitoring other forms of communication including but not limited to blogs, wikis, internet postings, shared videos, pictures, etc. In other instances, well-known instructions, protocols, structures and techniques have not been shown in detail in order not to obfuscate the description.

Embodiments described herein comprise techniques for protecting a user from offensive behavior in communications and notifying the user and/or an enforcement entity of the offensive behavior. In some embodiments, the offensive content analysis system monitors communications between users for offensive behavior. The offensive content analysis system may measure the level of current offense in the communication and determine a historical offensive behavior pattern for the communication sender. The offensive content analysis system may then determine if the offensive behavior, both current and historical, rises to a threshold behavior level. The offensive content analysis system may take one or more notifications action, if the offensive behavior reaches the threshold level.

In some embodiments, the offensive content analysis system detects a communication from a user. The offensive content analysis system may determine if there is any offensive behavior in the communication. The offensive content analysis system may determine a historical offensive behavior pattern for the communication sender, or user. The current and historical offensive behavior may then be compared to a threshold behavior level to determine if the communication is inappropriate for the communication receiver. If the offensive behavior reaches the threshold behavior level, the offensive content analysis system may take a notification action to alert an appropriate entity. For example, the offensive content analysis system may alert the communication receiver, or a law enforcement entity. If the offensive behavior does not exceed the threshold level, the offensive content analysis system may take no action and allow the user and the communication receiver to communicate.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to magnetic storage medium (e.g., floppy diskette), optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions. In addition, embodiments may be embodied in an electrical, optical, acoustical or other form of propagated signal (e.g., carrier waves, infrared signals, digital signals, etc.), or wire line, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

FIG. 1 depicts a block diagram of an offensive content analysis system 100 configured to detect offensive content or behavior in communications and notify an appropriate entity, according to some embodiments of the invention. As shown, the offensive content analysis system 100 may include a content server 102, a communication network 104, and two or more communication devices 106A-N. The server 102 may include an offensive content analysis unit 108, a transceiver unit 110 and a system controller 112. The transceiver unit 110 allows the content server to send and receive data and/or communications. The communication network 104 allows for communication between the server 102 and the two or more communication devices 106A-N.

The offensive content unit 108 may be configured to monitor and/or review communications between the two or more devices 106. In some embodiments, communications between the devices 106A-N pass through the content server 102. The offensive content unit 108 may determine if there is offensive material in the communications. The offensive content unit 108 may determine a historical offensive behavior pattern for the user that created the communication. The offensive content unit 108 may then determine if the offensive behavior rises to a threshold behavior level. The offensive content unit 108 may take a notification action to alert an appropriate enforcement entity of the offensive behavior.

The system controller 112 manages the data sent to and from the one or more communication devices 106A-N. The system controller 110 may also control various standard features used by the server, or internet service provider, for the communication devices 106 A-N including, but not limited to, email routing, instant message routing, hosting websites, allowing access to websites, and the like.

The communication devices 106A-N may be any device capable of sending and/or receiving communications from users and/or entities. For example, the communication device 106 may be a computer, a cell phone, a personal digital assistant a telephone, and the like. The communications may be any communication capable of relaying data and/or information to a receiver or user. The communications can include email messages, text messages, communications in the virtual world, instant messaging, on-line messaging, blogs, wikis, and phone conversations. The communication devices 106A-N may allow a user to create and convey a communication to another user(s), or communication receiver.

There may be one or more enforcement entities (not shown) which may be notified of offensive behavior in communications. The enforcement entities in some embodiments may be a guardian, boss, or parent of the communication receiver. Further, it should be appreciated that the enforcement entity may be any entity capable of taking some action regarding the offensive behavior including, but not limited to, a law enforcement agency, an internet service provider, an owner of a website, a phone service provider and the like.

Figure 2:
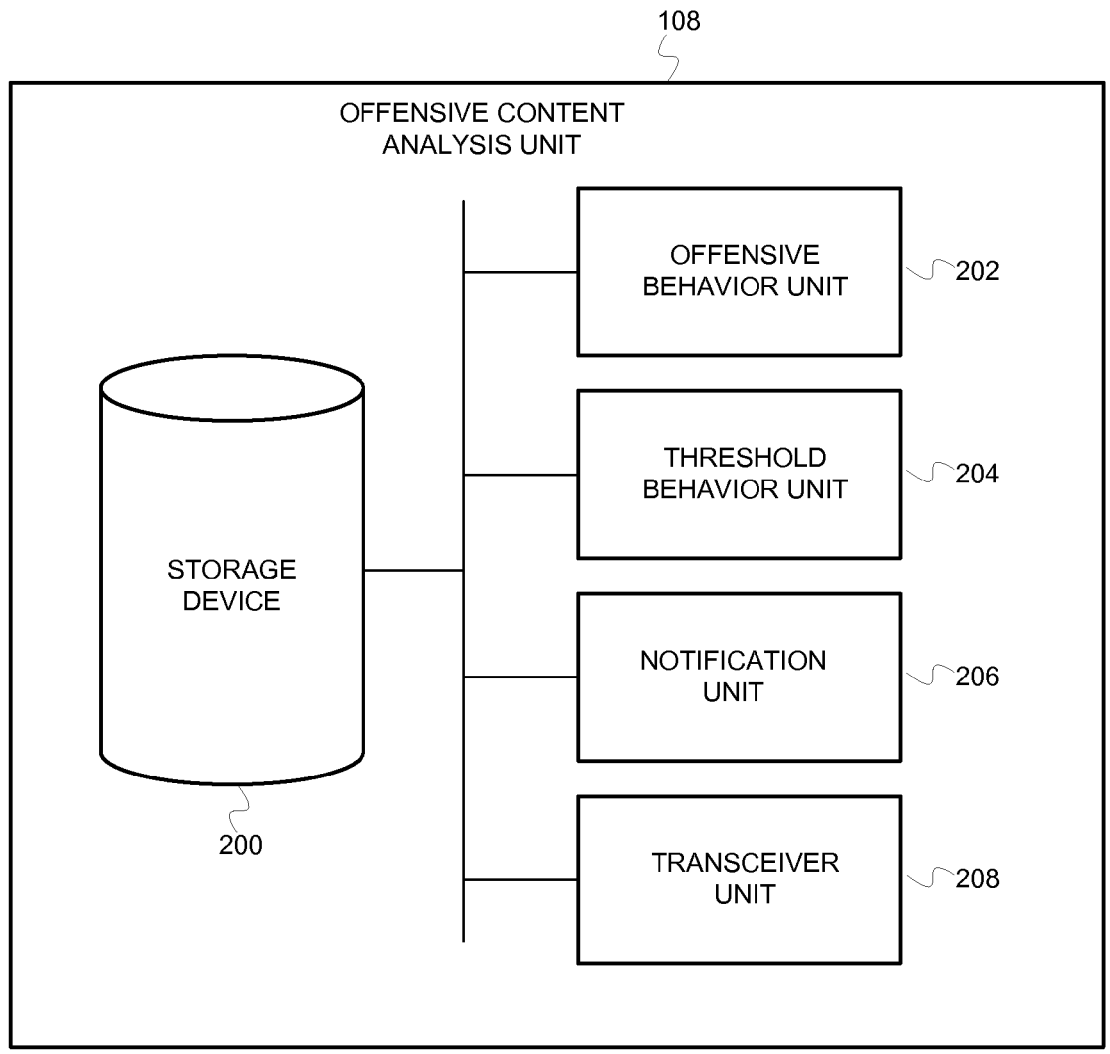
FIG. 2 depicts a block diagram illustrating an offensive content analysis unit configured to detect offensive behavior in a communication and notify an enforcement entity in an embodiment of the invention.

FIG. 2 depicts a block diagram of the offensive content analysis unit 108 according to some embodiments of the invention. The offensive behavior unit 108 may include an offensive behavior unit 202, a threshold behavior unit 204, a notification unit 206 and a transceiver unit 208. The storage unit 200 may store any suitable data, and/or information, relating to the offensive content analysis system 100 including, but not limited to, offensive behavior associated with a current session, historical offensive behavior patterns, user information, data about current and historic communications, threshold behavior levels, etc. The offensive content analysis unit 108 monitors communications between users and notifies an appropriate enforcement entity when the offensive content of the communication reaches and/or surpasses a threshold level, as will be described in more detail below.

The offensive behavior unit 204 may monitor current communications between users. The offensive behavior unit 204 may detect offensive behavior in the current communications. The offensive behavior in the current communications may become a current offense metric. The current offense metric may be used by the offensive content analysis system 100 to determine if any notification action should be taken, as will be discussed in more detail below. The offensive behavior may be any type of communication which may be offensive to the communication receiver including, but not limited to, nudity, strong language, religious views, deceit, etc.

To detect deceit, the offensive behavior unit 204 may perform a language pattern analysis. For example, the offensive behavior unit 204 may compare the language used by the user in the communication with language typically used by a user of a particular age group. Thus, if a forty year old man is posing as a teenager in a communication, the offensive behavior unit may compare the language used by the communication sender with typical language used by a teenager. In another example, the offensive behavior unit may look for contradictory statements made by the communication sender to determine that deceit is present, thus, if the user says one statement in a communication and later contradicts that statement, the offensive behavior unit 204 may detect deception.

The offensive behavior unit 202 may store data indicating the offensive behavior from user(s) in order to maintain a historical offensive behavior pattern for the user(s). Upon detection of offensive behavior in the current communication, the offensive behavior unit 202 may access the historical offensive behavior pattern for the communication sender that sent the offensive or inappropriate material in the current communication. The historical offensive behavior pattern may become a historical offense metric. The historical offense metric may be used by the offensive content analysis system 100 to determine if any notification action should be taken as will be discussed in more detail below.

The threshold behavior unit 204 may allow a user, and/or an entity, to set a threshold behavior level. Further, the threshold behavior level may be an initial default within the offensive content analysis unit 108. The threshold behavior level is a level of behavior to which the current offense metric and/or the historical offense metric are compared when determining what action, if any, to take. Any one of the enforcement entities, and/or user(s), may determine the threshold behavior level. For example, a parent may not want any strong language, deceitful language, or religious views expressed to his or her child. The parent may then use the threshold behavior unit 204 to set the threshold behavior level. The threshold behavior level may then be compared to the current offense metric and/or the historical offense metric. When the current offense metric and/or the historical offense metric meet and/or surpass the threshold behavior level, the threshold behavior unit 204 may allow the notification unit 206 to take appropriate action.

When the threshold behavior level is reached, the offensive material in the communication may exceed the minimum threshold level. Thus, there may be varying behavior levels beyond the initial threshold behavior level. For example, there may be a low, a medium, and a high offensive behavior level. Any user or enforcement entity may set the behavior levels, as described above. Further, the levels may be preset as a default for the offensive content analysis unit 108. For example, a parent may decide that offensive language requires a low offensive behavior level, religious views require a medium offensive behavior level, and nudity requires a high offensive behavior level. The parent may then set the threshold and offensive behavior levels based on the parent's view of the material. Further, each enforcement entity may set their own offensive behavior levels based on their own concerns. The offensive behavior levels are described as being low, medium, or high; however, it should be appreciated that any number of behavior levels may be set depending on the concerns of the user, and/or enforcement entity.

The notification unit 206 can determine which enforcement entity to contact and/or what type of action should be taken based on the offensive metrics, the threshold behavior level(s), and/or the offensive behavior levels. The notification unit 206 may compare the threshold behavior level and/or the offensive behavior level with one or more notification actions. Based on the threshold behavior level and/or the offensive behavior level, the notification unit 206 will notify the appropriate enforcement entity of the offensive behavior. Any of the user(s) and/or enforcement entities may set the notification actions. For example, a parent may set the notification unit 206 in the following manner: alert the parent in the event the threshold behavior level is met, alert the parent if the offense metrics reach the low offensive behavior level, alert the website owner if the offense metrics reach the medium offensive behavior level, and alert the police if the offense metrics reach the high offensive behavior level. Thus, the notification unit 206 may escalate the notification action based on the offensive metrics in the current and historical communications sent by the communication sender, or user.

The enforcement entity may be any enforcement entity capable of taking an enforcement action including, but not limited to, a parent, a guardian, a teacher, a school administrator, a community leader, a boss, a supervisor, a security guard, a law enforcement agency, an internet service provider, a website owner, and the like. The enforcement action taken by the enforcement entity may vary depending on the offense metrics. For example, the enforcement entity may take any range of actions including, but not limited to, doing nothing, arresting the communication sender, etc.

The transceiver unit 208 may allow the offensive content analysis unit 108 to send and receive information or data. The information and/or data may be any suitable information related to the offensive content analysis system 100.

Although the offensive content analysis unit 108 is shown as one unit in a server client model, it should be appreciated that the offensive content unit 108 may be included wholly or partially on any number of the communication devices 106A-N, and/or the server 100. Further, it should be appreciated that the components of the offensive content analysis unit 108, such as the offensive behavior unit 202, the threshold behavior unit 204, and/or the notification unit 206, may be included wholly or partially in other components of the offensive content analysis system 100.

Figure 3:
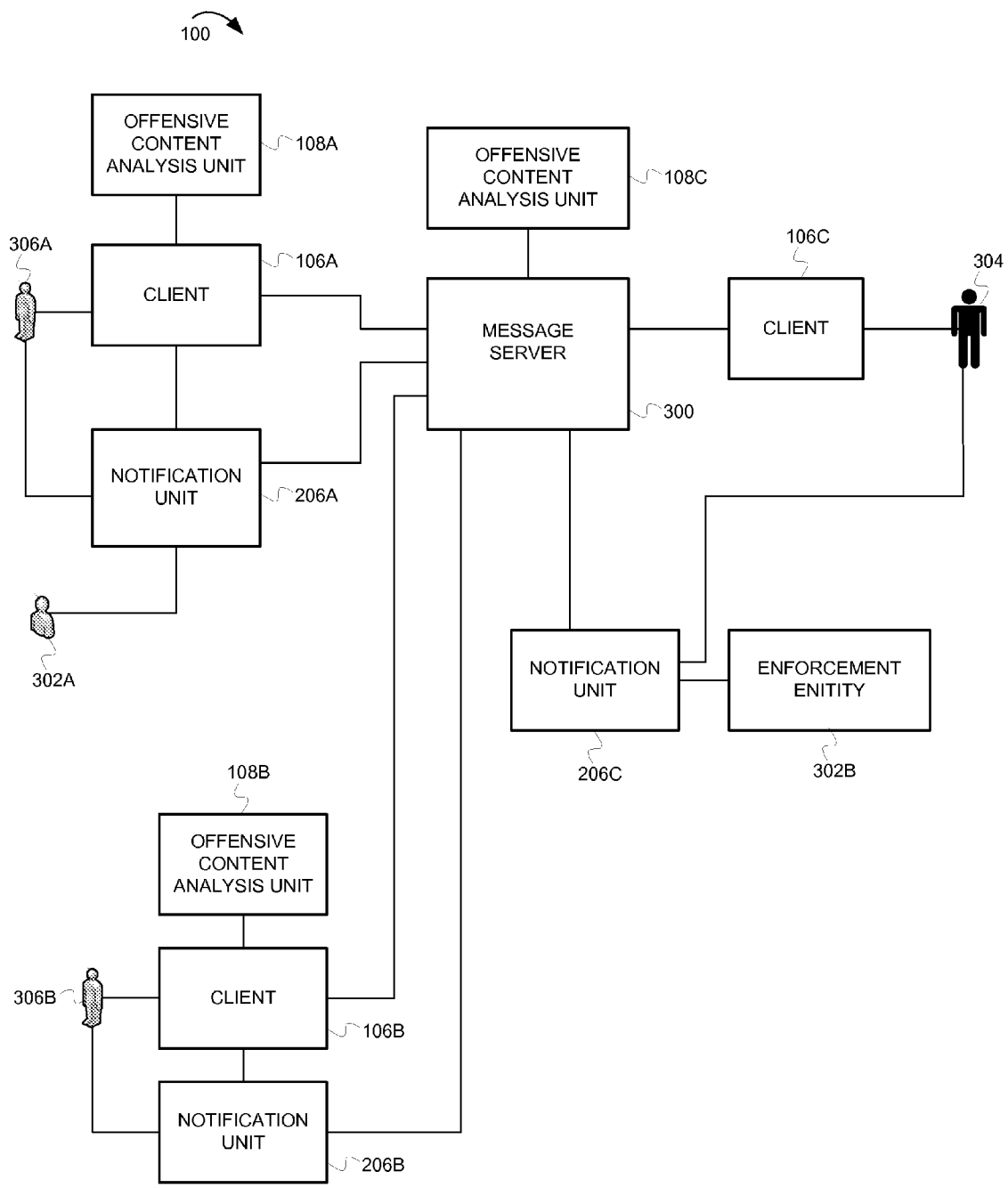
FIG. 3 depicts a block diagram illustrating a communication management system configured to detect offensive behavior in a communication and notify an enforcement entity in an embodiment of the invention.

FIG. 3 depicts a block diagram of the offensive content analysis system 100 according to some embodiments of the invention. The offensive content analysis system 100, as shown, represents an instant messaging communication format. The offensive content analysis system 100 includes a message server 300; communication devices 106A, 106B and 106C; a plurality of offensive content analysis units 108A, 108b and 108C; a plurality of notification units 206A, 206B and 206C; a plurality of enforcement entities 302A and 302B; a communication sender 304; and a plurality of communication receivers 306A and 302B. As shown, the message server 300, and communication devices 106A and 106B each include an offensive content analysis unit 108A-C, and a notification unit 206A-C. The notification units 206A-C are shown as separate units from the offensive content analysis units 108A-C; however, it should be appreciated that the notification units 206A-C may be included in the offensive content analysis units 108A-C. Although FIG. 3 shows one way the components are connected, the components can be connected according to any suitable connectivity scheme.

In operation, the message sender 304 may prepare an instant message to send to message receiver(s) 306A, and/or 306B. The sender 304 prepares the message using the communication device 106C. The communication sender 304 may then send the message to the message server 300, which can relay the message to the device of the communication receiver(s) 306A and/or 306B. The message server 300 may have established a threshold behavior level and offensive behavior levels. Each of the communication devices 106A and 106B may have set separate threshold behavior levels and offensive behavior levels. Thus, each component can monitor messages according to their behavior criteria. For example, the message server 300 may review a communication to determine if it should perform a notification action, and the communication devices 106A and 106B may review the same communication to determine if they should perform a notification action. Further, each of the offensive content analysis units 108A-C may store a historical offensive behavior pattern for the communication sender 304. If a notification action should be taken, the notification unit 206A, 206B, and/or 206C may notify the appropriate enforcement entity. Thus, the guardian 302A may be notified of offensive material being communicated to the guardian's child. The guardian may then take action to protect his or her child. The communication receiver 306B may receive notification from the notification unit 206B of the offensive content and take appropriate action. Further still, notification unit 206C for the message server 300 may inform the communication sender 304 of the problem with the communication, and if the offensive behavior continues the notification unit 206C may determine that further action should be taken and/or a law enforcement agency should be notified.

Figure 4:
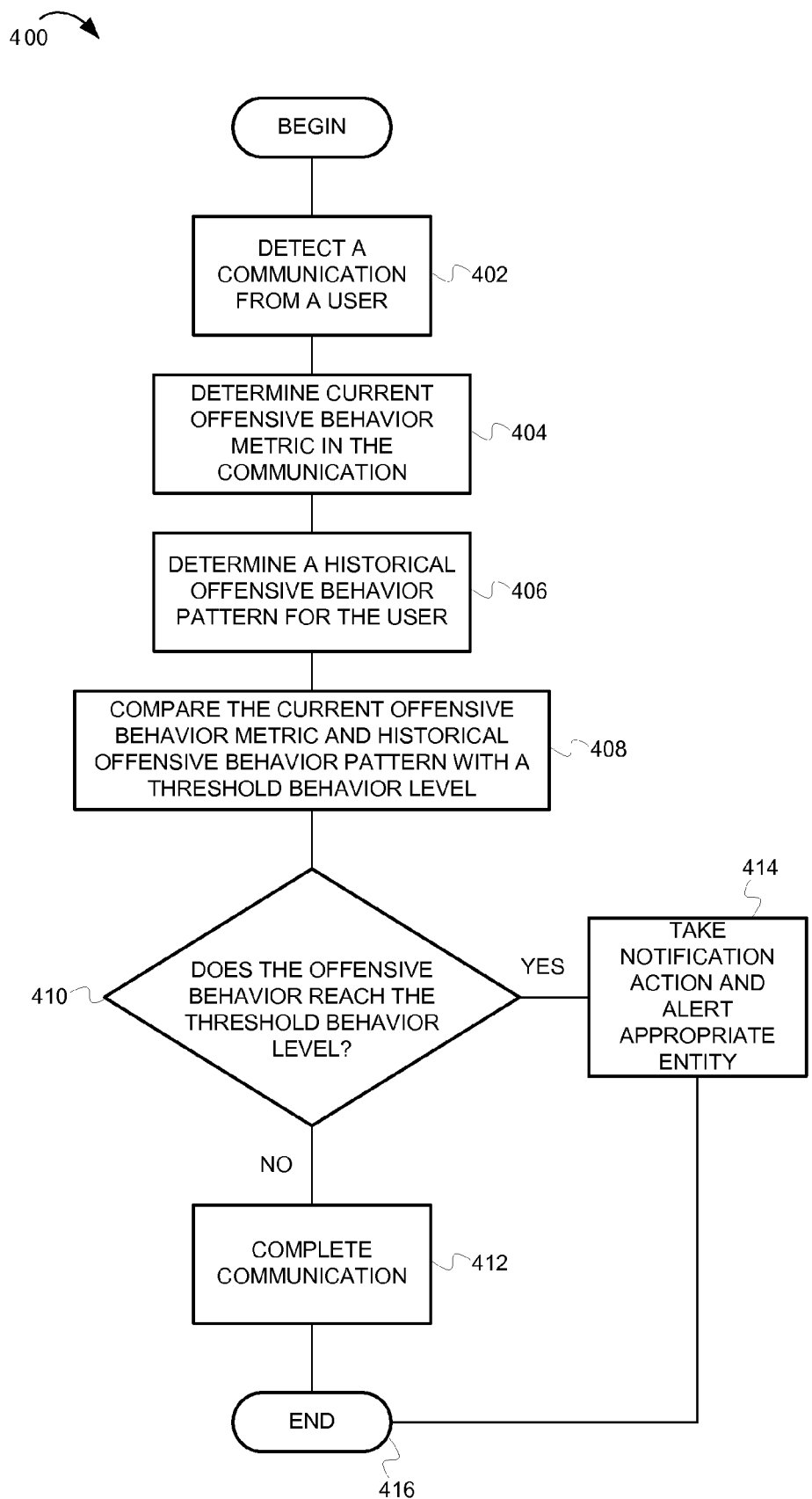
FIG. 4 depicts a flowchart illustrating the operation of the communication management system in an embodiment of the invention.

FIG. 4 depicts a flow diagram illustrating the operations of the offensive content analysis system 100, according to some embodiments of the invention. The flow 400 begins at block 402, where a communication is detected from a user. The server 102 may detect one or more communications from a device 106, where the communications are associated with a user. The communications may be any type of communications or information which is relayed to another user. The communications can include an instant message, an email, a communication in the virtual world, a blog posting, a wiki posting, a phone conversation, a text message, and the like.

The flow continues at block 404, where a current offensive behavior metric is determined for the communication. The offensive behavior unit 202 determines if there is any offensive behavior in the current communication. The offensive behavior in the current communication becomes the current offensive behavior metric. The offensive behavior may be strong language, nudity, religious views, deceit, and the like. The offensive behavior unit may use any number of methods to determine if offensive behavior is contained in the communication. For example, the offensive behavior unit 202 may search the communication for particular inappropriate words or word combinations. The offensive behavior unit 202 may scan any pictures and compare the amount of skin shown on the picture to determine there is a probability that the image contains nudity. The offensive behavior unit 202 may scan the communication for religious images, words, or combinations of words, which contain religious statements that may be offensive. Further, the offensive behavior unit 202 may determine that deceit is contained in the communication by using any suitable methods including the methods described above. In yet another example, the communication is a voice conversation and the offensive behavior unit 202 analyzes the language used by the communication sender in order to determine if any offensive behavior is being expressed by the sender. Any combination of suitable techniques, including the techniques described herein, may be used to detect offensive behavior and determine the current offensive behavior metric.

The flow continues at block 406, where a historical offensive behavior pattern is determined for the communication sender. The offensive content analysis unit 108 can stores the history of any user who has sent offensive material in communications. The history of the user's offensive communications is stored as a historical offensive behavior pattern for the user.

In one example, when the communication sender sends a current communication, the content analysis unit determines if the communication sender has sent offensive material in the past. This past offensive behavior then becomes the communication sender's historical offensive behavior pattern. The historical offensive behavior pattern may range from no history of offensive communications from the communication sender, to a history of repeatedly communicating offensive behavior. The historical offensive behavior pattern allows the offensive content analysis system 100 to protect users and/or notify an enforcement entity of a potential problem with the communication sender based on the communication senders historical behavior patterns.

The flow continues at block 408, where the current offensive behavior metric and/or the historical offensive behavior pattern are compared with a threshold behavior level. The threshold behavior level is a minimum level of acceptable behavior that is allowed before some type of action is required. Thus, the current offensive behavior metric alone may reach the threshold behavior level. Additionally, the historical offensive behavior pattern may reach the threshold level. In some embodiments, both the historical offensive behavior pattern and the current offensive behavior metric affect the determination about whether the threshold level has been reached.

The threshold behavior level may be set by any user and/or enforcement entity. For example, the message server may set the threshold level very high. The message server may be unconcerned about users exchanging messages with strong language. However, the message server may be interested in stopping criminal behavior in communications. Thus, the message server may set the threshold behavior level to a level that would check for illegal images, fraud in the communication, deceit in a communication to a child, adults attempting to deceive children, and the like.

In another example, the threshold behavior level may be set by a guardian or a parent of a user. In this instance, the guardian may set the threshold behavior level very low. The guardian may want to protect the child from certain types of offensive behavior, such as deceit, strong language, nudity, and religious views. The guardian may set each of the types of offensive material to a different level; for example, the guardian may want to strenuously monitor offensive language, nudity, and deceit, while not monitoring religious view as vigorously. Thus, the guardian may customize the threshold behavior level for a child based on the guardian's concerns.

In yet another example, any user may set the threshold behavior level. For example a user may not care about strong language, or religious views, but may want to be alerted to the presence of deceit or fraud. The user may then set the threshold behavior level to look for deceit in any communication received or viewed by the user.

In yet another example, any enforcement entity such as a law enforcement entity, a government, or a corporation may set the threshold level in order to monitor all communications sent within the enforcement entities jurisdiction. The enforcement entity may customize the threshold levels based on the entities concerns, as described herein.

Therefore, each communication may encounter several threshold behavior levels as it is communicated to the user. For example, the communication may first encounter the message server's threshold behavior level. The communication may then encounter an enforcement entities threshold behavior level, for example a government entity monitoring communications between users. The communication may then encounter a threshold behavior level set by a guardian of the communication receiver. The communication may then encounter the threshold behavior level of the communication receiver.

The flow continues at block 410, where it is determined if the offensive material in the current offensive behavior metric and/or the historical offensive behavior pattern reaches the threshold behavior level. If the current and/or historical offensive behavior do not reach the threshold behavior level no action is taken and the flow continues at block 412 where, the communication is completed.

If the current offensive behavior metric and/or the historical offensive behavior pattern reach the threshold level, the flow continues at block 414, where a notification action is taken. The notification action may take the form of an active notification and/or an escalation notification. Further, it should be appreciated that any suitable notification method may be used to alert the appropriate enforcement entity and/ or user.

In the active notification mode, the offensive content analysis unit 108 notifies the appropriate enforcement entity and/or user immediately upon the current offensive behavior metric and/or historic offensive behavior pattern reaching the threshold behavior level. For example, a guardian may immediately receive a notification and/or alert that a child is receiving offensive material. The alert may come in any suitable form including, but not limited to, an email, a text message, an instant message, a voice call, and the like. Upon receiving the alert, the enforcement entity and/or user may take appropriate action in order to protect themselves, and/or another user from the communications sent from the communication sender. The action may include doing nothing, limiting the user's contact with the sender, removing the user from the communication device, alerting the appropriate authorities and/or other enforcement entities.

In the escalation notification mode, the notification unit may escalate the type of notification action taken based on the type of offensive behavior level, and/or the frequency of occurrences. Based on the offensive behavior levels set by the various enforcement entities, the notification unit may escalate the action taken by the offensive content analysis system 100. For example, in the case of a child who has a guardian, the guardian may set the threshold behavior levels and the offensive behavior levels. The guardian may set the offensive behavior levels (i.e., indicate what constitutes offensive behavior) for a low, medium, and high offensive behavior levels. When the threshold behavior level is met and the combination of the current offensive behavior metric and the historical offensive behavior pattern reaches the low offensive behavior level, the notification action may be to alert the receiver (e.g., a child) of the offensive behavior. If the offensive behavior escalates and/or reaches the medium offensive behavior level, the notification action may be to alert a guardian. If the offensive behavior reaches the high offensive behavior level, the notification action may be to close the communication channel between the receiver (e.g., the child) and the communication sender. Further, the notification action may be to contact a higher authority, and/or enforcement entity regarding the communication sender.

In another example, a user may want limited monitoring of the communications he or she receives. Thus, the user may set the threshold behavior level and the offensive behavior levels for a particular kind of offensive behavior, such as deceit. In this instance, the offensive content analysis unit would only monitor communications for deceit, while not notifying the user of other types of potentially offensive material. The user may set a low offensive behavior level and a high offensive behavior level (i.e., define what constitutes offensive behavior at low and high levels). When there is deceit in a communication and the threshold behavior level is met and the combination of the current offensive behavior metric and the historical offensive behavior pattern reaches the low offensive behavior level, the notification action may be to alert the user of the deceit in the communication. If the offensive behavior (i.e., deceit) escalates, and/or initially reaches the high offensive behavior level, the notification action may be to close the communication channel between the user and the communication sender. Further, the notification action may be to contact a higher authority, and/or enforcement entity regarding the communication sender.

In yet another example, the message server may want to monitor communications sent through its service. The message server may set the threshold behavior level and the offensive behavior levels based on material that may have the potential for being illegal. The message server may set a low offensive behavior level, a medium offensive behavior level, and a high offensive behavior level. The escalation steps for the message server may deal directly with the communication sender. Thus, when the offensive material in the communication reaches the threshold level and the low offensive behavior level, the message server may alert the communication sender that their behavior is inappropriate. Further, the intended communication receiver may block the communication, and the message server may inform the communication sender that a user has been blocked from communication. If the offensive behavior escalates, and/or initially reaches the medium offensive behavior level, the notification action may be to lock the communication sender from access to the message server (i.e., preclude the sender from sending messages in the system 100). In this example, the communication sender may be alerted that their access has been blocked by the message server and/or that multiple users have been blocked from communication. The message server may send a corrective measure to the communication sender in order to modify the communication sender's behavior in the future. For example, the corrective measure may be to send terms and conditions for using the message server. If the communication sender agrees to the terms and conditions, their access may be resumed. If the offensive behavior continues to escalate and/or initially reaches the high offensive behavior level, the notification action may be block the communication senders access and notify the appropriate enforcement entity, such as a law enforcement entity. After the notification action is taken, the flow ends at block 416.

Embodiments of the system can be formed according to various architectures. As shown in FIG. 1, many components for detecting and responding to offensive behavior may be included in a content server. However, as shown in FIG. 2, the components may be distributed throughout a network. In other instances, the components may be contained in the communication devices. As a result, the communications devices, servers, and other suitable components can perform the operations described herein.

Although, the offensive content analysis system 100 is described as monitoring all communications between users, it should be appreciated that the monitoring may be limited. For example, any user, and/or enforcement entity may include a list of people who are never monitored. In yet another example, a corporation may want to monitor some of its employees while allowing other employees to communicate without being monitored.

Figure 5:
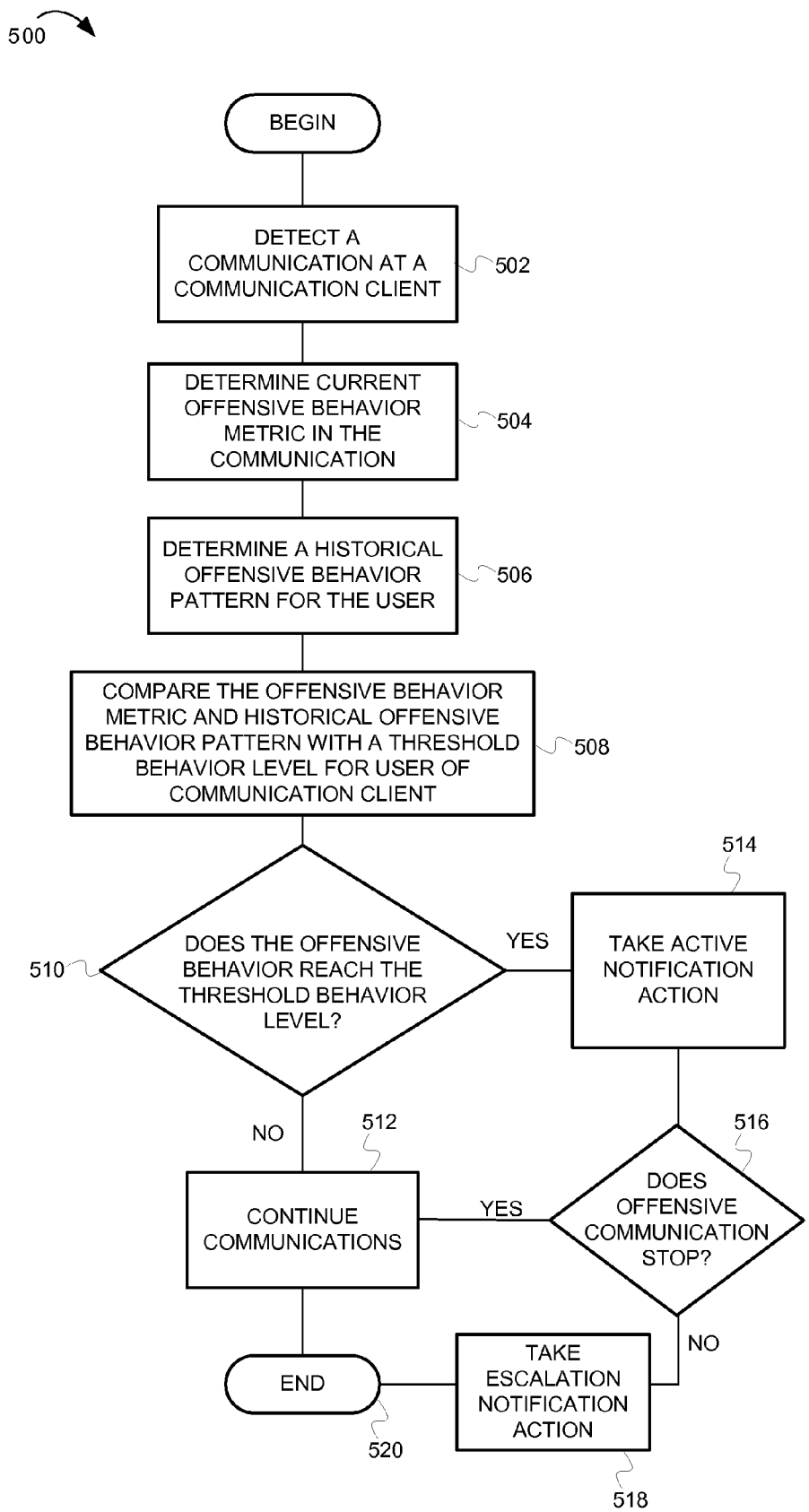
FIG. 5 depicts a flowchart illustrating the operation of the communication management system in an embodiment of the invention.
Figure 6:
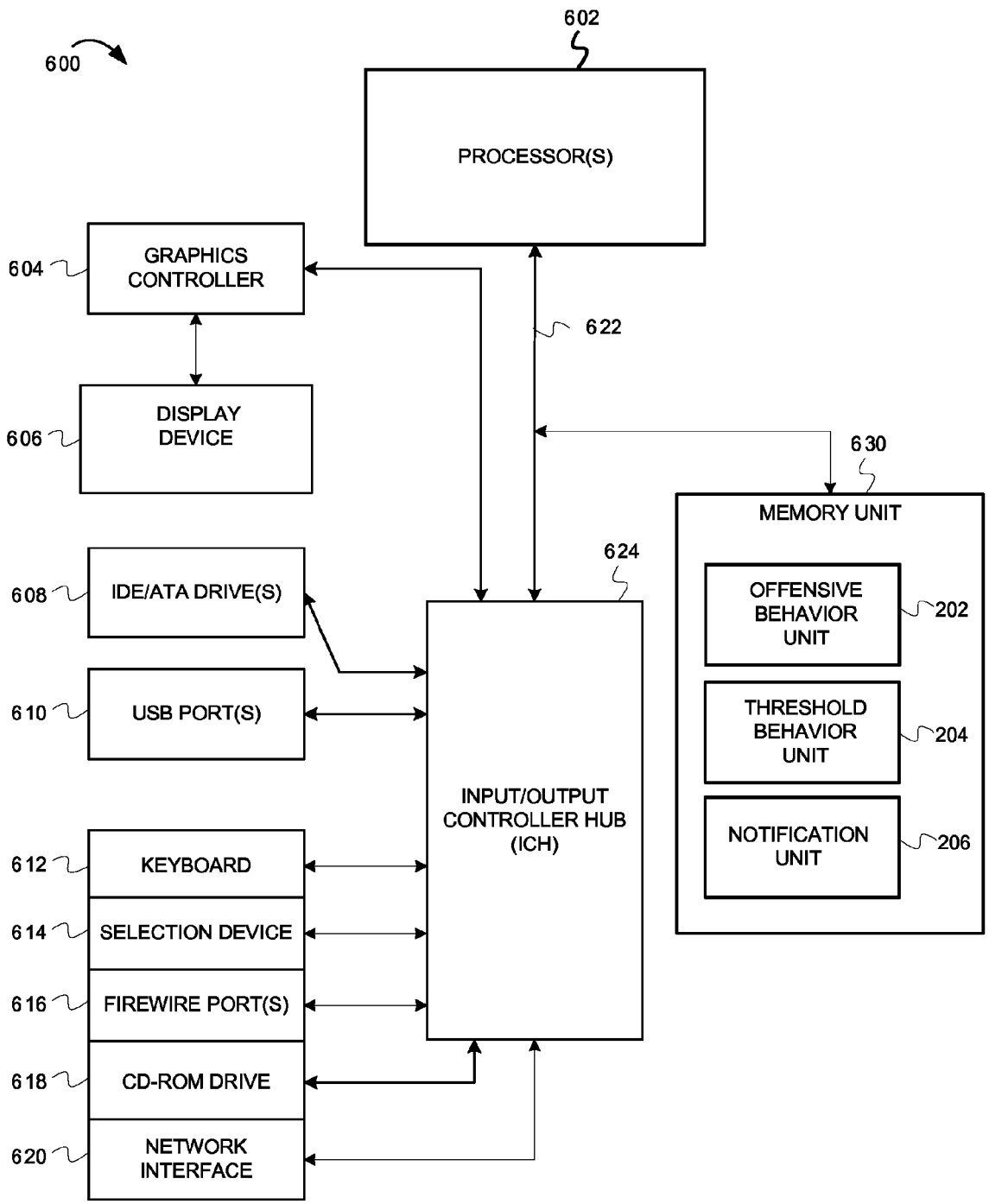
FIG. 6 depicts a schematic diagram of a computer system in an embodiment of the invention.

FIG. 5 depicts an example computer system. A computer system includes a processor unit 502 (possibly including multiple processors, multiple cores, multiple nodes, and/or implementing multi-threading, etc.). The computer system includes memory 530. The memory 530 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 524 (e.g., PCI, ISA, PCI-Express, HyperTransport®, InfiniBand®, NuBus, etc.), a network interface 520 (e.g., an ATM interface, an Ethernet interface, a Frame Relay interface, SONET interface, wireless interface, etc.), and a storage device(s) 530 (e.g., optical storage, magnetic storage, etc.). The system memory 530 embodies functionality to implement embodiments described above. The system memory 530 may include one or more functionalities that facilitate detecting current offensive material in communications, determining a historical offensive behavior pattern, and taking a notification action based on the offensive material. To this end the memory 530 may include the offensive behavior unit 202, the threshold behavior unit 204 and the notification unit 206. Any one of these functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the storage device(s) 530, and the network interface 520 are coupled to the bus 524. Although illustrated as being coupled to the bus 524, the memory 530 may be coupled to the processor unit 502.

While the embodiments are described with reference to various implementations and exploitations, it will be understood that these embodiments are illustrative and that the scope of the inventive subject matter is not limited to them. In general, techniques for determining current and offensive behavior of a communication sender and taking one or more notification actions based on the offensive behavior as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving a plurality of threshold levels from a plurality of enforcement entities, the plurality of enforcement entities each having different entity types;
   associating a threshold level of the plurality of threshold levels with an enforcement entity providing the threshold level;
   detecting a communication from a device, wherein the communication is associated with a user;
   determining an offensive behavior metric of the communication, wherein the offensive behavior metric is a level of offensive material contained in the communication during a current communication session;
   determining a historical offensive behavior metric from a stored historical offensive behavior pattern;
   determining that the offensive behavior metric reached at least two of the plurality of threshold levels; and
   notifying a subset of enforcement entities of the plurality of enforcement entities associated with the at least two of the plurality of threshold levels about the offensive behavior.

2. The method of claim 1, wherein notifying the enforcement entity further comprises notifying a victim of the offensive behavior.

3. The method of claim 1, wherein the enforcement entity is a guardian of a receiver of the communication.

4. The method of claim 3, further comprising the guardian taking an action to prevent the receiver from further communication with the user.

5. The method of claim 1, wherein notifying the enforcement entity further comprises notifying a message server.

6. The method of claim 5, further comprising taking an escalation notification action.

7. The method of claim 6, wherein taking the escalation notification action further comprises notifying a law enforcement agency of the offensive behavior.

8. The method of claim 6, wherein taking the escalation notification action further comprises sending the user a warning regarding the offensive behavior.

9. The method of claim 6, wherein taking the escalation notification action further comprises suspending the user's account with the message server.

10. An apparatus comprising:
    an offensive behavior unit configured to analyze a communication from a user and determine an offensive behavior metric for the;
    a threshold behavior unit configured to compare the offensive behavior metric a plurality of threshold behavior levels, wherein the plurality of threshold behavior levels are established by a plurality of enforcement entities having different entity types, wherein each behavior level of the threshold behavior levels are associated with an enforcement entity providing the threshold behavior level; and
    a notification unit configured to notify a subset of at least two of the enforcement entities associated with a subset of at least two of the plurality of threshold behavior levels in response to determining that the offensive behavior metric reaches the at least two of the plurality of threshold behavior levels.

11. The apparatus of claim 10, wherein the enforcement entity is a guardian of a communication receiver.

12. The apparatus of claim 11, wherein the notification unit is configured to take alert the guardian of the offensive behavior using an instant message.

13. The apparatus of claim 10, wherein the threshold behavior level is determined by the enforcement entity.

14. The apparatus of claim 10, wherein the enforcement entity is a message server.

15. A computer program product for providing notification of offensive behavior, the computer program product comprising a computer readable memory device having program instructions embodied therewith, the program instructions executable by a processor to cause the processor to perform operations comprising:
    receiving a plurality of threshold levels from a plurality of enforcement entities;
    associating a threshold level of the plurality of threshold levels with an enforcement entity of the plurality of enforcement entities providing the threshold level;
    detecting a communication from a device, wherein the communication is associated with a user;
    determining an offensive behavior metric of the communication, wherein the offensive behavior metric is a level of offensive material contained in the communication during a current communication session;
    determining a historical offensive behavior metric from a stored historical offensive behavior pattern;
    determining that the offensive behavior metric reached at least two of the plurality of threshold levels; and notifying a subset of the plurality of enforcement entities associated with the at least two of the plurality of threshold levels about the offensive behavior.

16. The computer program product of claim 15, wherein notifying the enforcement entity further comprises notifying a victim of the offensive behavior.

17. The computer program product of claim 15, wherein the enforcement entity is a guardian of a receiver of the communication.

18. The computer program product of claim 17, wherein the operations further comprise the guardian taking an action to prevent the receiver from further communication with the user.

19. The computer program product of claim 15, wherein notifying the enforcement entity further comprises notifying a message server.

20. The computer program product of claim 19, wherein the operations further comprise taking an escalation notification action.

* * * * *